United States Patent [19]
Nakamura et al.

[11] 3,774,982
[45] Nov. 27, 1973

[54] BEARING DEVICE FOR ROTARY MACHINES

[75] Inventors: Toshio Nakamura, Hitoshi Egawa, Sadaharu Kawai, all of Hitachi, Japan

[73] Assignee: Hitachi, Ltd., Tokyo, Japan

[22] Filed: Dec. 2, 1971

[21] Appl. No.: 203,962

[52] U.S. Cl. .................................. 308/187.1
[51] Int. Cl. .................................. F16c 33/76
[58] Field of Search .............................. 308/187

[56] References Cited
UNITED STATES PATENTS
3,663,077  5/1972  Nakumura ................. 308/187
FOREIGN PATENTS OR APPLICATIONS
808,502  2/1959  Great Britain ............... 308/187

Primary Examiner—Charles J. Myhre
Assistant Examiner—Frank Susko
Attorney—Craig, Antonelli & Hill

[57] ABSTRACT

A bearing device for rotary machines, e.g. motors for vehicles, which is so designed as to prevent air from flowing through a bearing element and thereby to prevent intrusion of water droplets and dust into said bearing element.

This bearing device is particularly adapted for use in supporting the portion of the rotary shaft of a rotary machine penetrating through the housing of the rotary machine and comprises a dust seal having a fan effect provided at a portion located exterior to the rotary machine. The fan effect of the dust seal offsets the flow of air otherwise passing through the bearing element from the exterior to the interior of the rotary machine under the influence of negative pressure created within the rotary machine during operation, whereby the instrusion of dust and water droplets, present in the atmosphere, into the bearing element is prevented and movement of a lubricant within the bearing element into the rotary machine is also prevented.

17 Claims, 4 Drawing Figures

BEARING DEVICE FOR ROTARY MACHINES

BACKGROUND OF THE INVENTION

Rotary machines, e.g., electric motors for vehicles, have a rotary shaft extending through the housing thereof and the driving force of the motor is transmitted to an axle through the meshing engagement between a gear fixedly mounted on one end of the rotary shaft and a gear fixedly mounted on the axle. The portion of the rotary shaft penetrating through the housing is generally supported by a bearing which is mounted in the housing wall of the motor, and a roller bearing having rollers interposed between an inner race and an outer race is usually used as the bearing to support the rotary shaft, with a view to reducing the size and weight of the motor.

The bearing device for vehicle motors comprising the aforesaid roller bearing has lubricant chambers formed on both sides of the roller bearing for sealingly containing a lubricant therein.

The vehicle motor also comprises a ventilation fan provided therein for causing air to flow through the motor to cool the interior of said motor. In such a motor, negative pressure is developed within the motor during operation by the effect of the ventilation fan and the fan effects of the rotor, and this negative pressure is largest at the peripheral surface of the rotary shaft. Thus, a considerably large negative pressure acts on the bearing device provided around the rotary shaft and supporting said rotary shaft at the portion penetrating through the housing of the motor. The magnitude of the negative pressure equally signifies the pressure differential between the interior and exterior of the motor. Therefore, the air exterior of the motor is sucked into the interior of the same through the bearing device, with the result that the dust and water droplets present in the atmosphere are admitted into the bearing device or the grease within the bearing device leaks into the motor. The leakage of grease and the intrusion of dust under the influence of negative pressure acting around the rotary shaft are attributable to the facts that the parts penetrating through the motor housing is the rotary shaft and that the gap between the stationary part and the movable part rotating at a high speed cannot be sealed. Namely, the air exterior of the motor flows into the motor along the rotating rotary shaft through the gap between said rotary shaft and the stationary part, and the dust and water droplets go into the bearing device while being entrained in the air flow and attach to the grease within said bearing device, deteriorating the grease and causing a damage to the roller bearing. Further, the air flow causes the grease to flow into the motor, so that the interior of the motor is contaminated and the insulating material of the winding is deteriorated by the grease attached thereto.

In order to prevent the flow of air through the bearing device, there has been employed a method in which complex labyrinth seals are formed between the stationary part and the rotating part on both sides of the roller bearing so as to prevent the air flow by the flow resistance of said labyrinth seals.

By the way, the vehicle motors are being required to rotate at higher speeds to meet the recent demand for increasing the speeds of vehicles and the actual measurement of the negative pressures within the vehicle motors has revealed that the negative pressure reaches as high as about −70 mmAq in most of the motors during the high speed operation and even to about −250 mmAq in the type of motor in which the rotary shaft is large in diameter and the fan effect of the ventilation fan and the fan effect of the rotor act synergistically, such as the so-called hollow shaft type vehicle motor having a hollow rotary shaft and another shaft extending through said hollow rotary shaft. With such a large negative pressure, it is almost impossible to prevent the flow of air through the bearing device, only by the flow resistance of the labyrinth seals no matter how complex the construction of said labyrinth seals may be.

SUMMARY OF THE INVENTION

An object of the present invention is to provide a bearing device for rotary machines, which is simple in construction and capable of preventing the flow of air through a bearing element.

Another object of the invention is to provide a bearing device for rotary machines, which is capable of preventing the intrusion of dust and water droplets into a bearing element.

Still another object of the invention is to provide a bearing device for rotary machines, which is capable of preventing an outward leakage of lubricant from a bearing element.

Other objects of the invention will become apparent from the following description of the drawings showing embodiments of the invention.

The feature of the present invention resides in the fact that, in a bearing device for supporting the rotary shaft of a rotary machine extending outwardly through the housing wall of said rotary machine, a dust seal having a fan effect is provided at a location close to the outer end of the slight gap between the outwardly extending portion of the rotary shaft and the bearing device.

DESCRIPTION OF THE PREFERRED EMBODIMENTS

Figure 1:
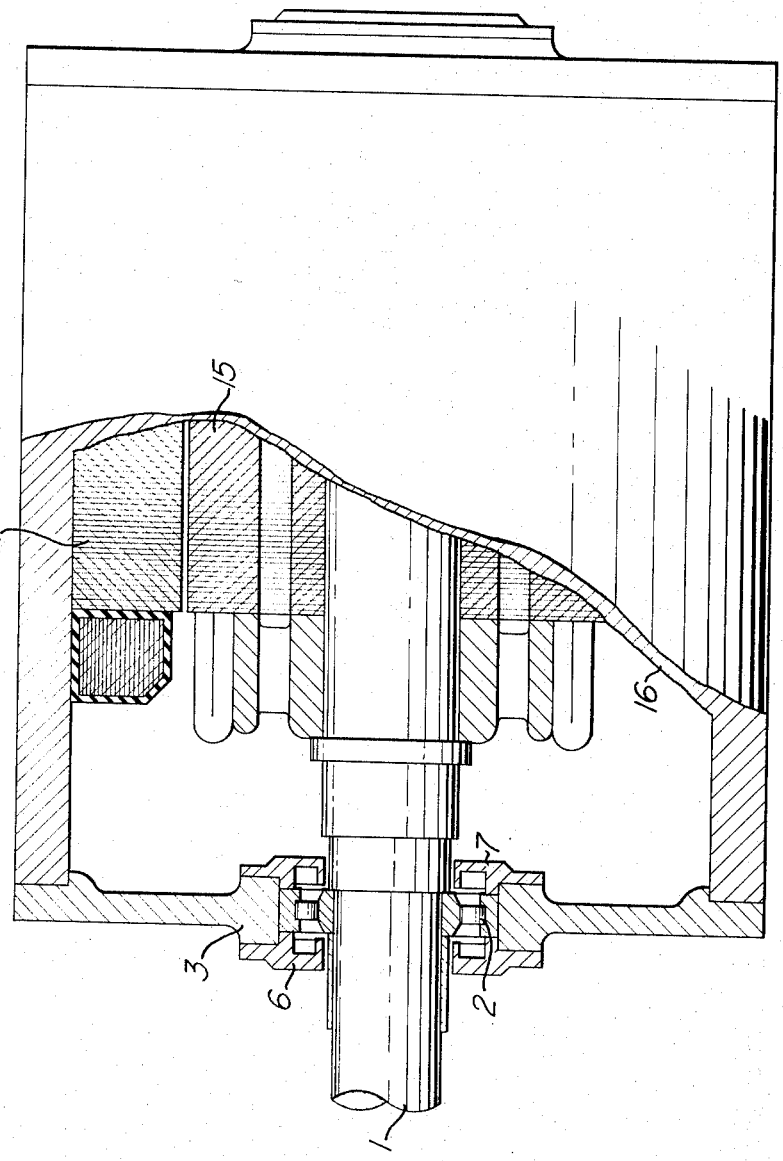
FIG. 1 is a side elevational view of an electric motor for vehicles, with a portion broken away to show the brief construction thereof.

The present invention will be described in detail with reference to the embodiments thereof shown in the drawings. Referring first to FIG. 1, there is shown an electric motor for vehicles. The motor is generally composed of a stator 17, a rotor 15 surrounded by said stator 17, a rotary shaft 1 having said rotor 15 fixedly mounted thereon and a bearing device rotatably supporting said rotary shaft 1.

The rotary shaft 1 extends horizontally and is rotatably supported by a roller bearing 2 having rollers. The outer race of the roller bearing 2 is mounted in an end plate 3 which constitutes a part of a housing of the motor. The opposite side surfaces of the roller bearing 2 are covered with bearing covers 6 and 7 attached to the end plate 3. The end plate 3 supporting the roller bearing 2 is connected to a casing 16 which holds the stator 17. The component parts of the motor, including the rotor 15 and the stator 17, are enclosed by the casing 16 and the end plate 3. However, one end of the rotary shaft 1 extends outwardly of the motor through the end plate 3 for mounting thereon a gear (not shown) to drive an axle (not shown).

Figure 2:
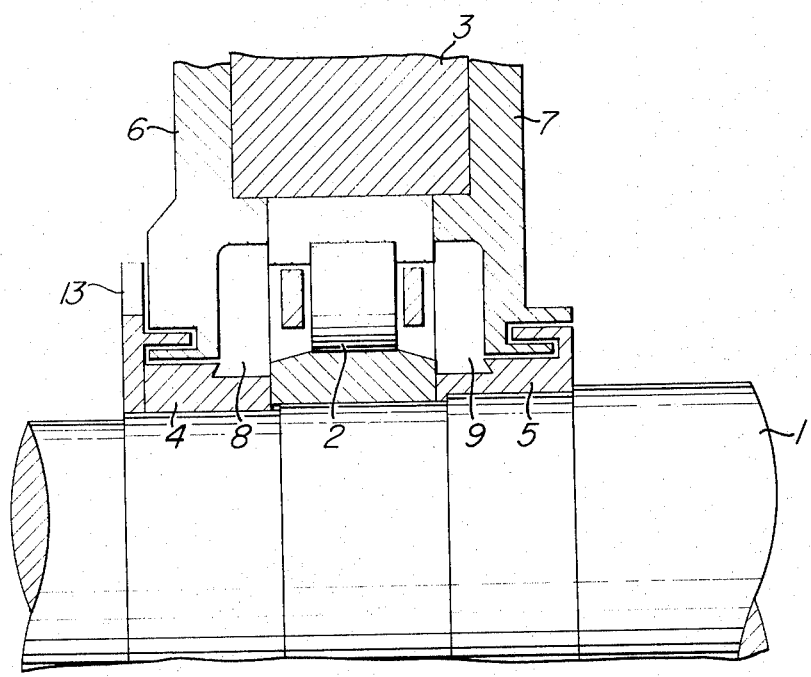
FIG. 2 is a vertical sectional view showing the upper half portion of an embodiment of the bearing device for rotary machines according to the present invention.
Figure 3:
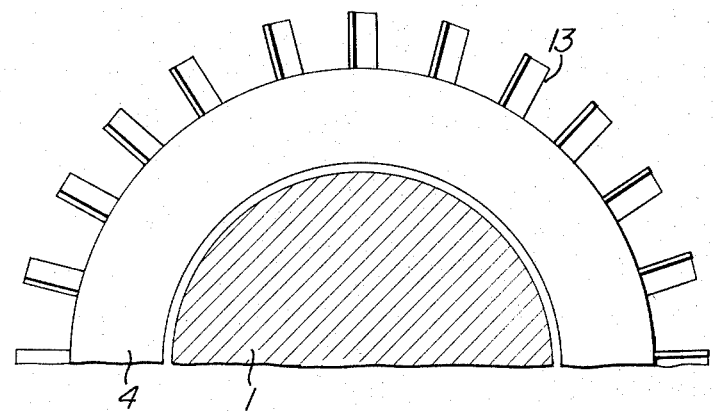
FIG. 3 is a view of the bearing device as viewed from the left side of FIG. 2.

In the construction described above, air pressure differential acts on both sides of the bearing device at the portion of the rotary shaft 1 penetrating through the end plate 3. In order to eliminate the influence of this pressure differential, the bearing device according to the present invention comprises labyrinth seals formed between the bearing covers 6, 7 and the rotary shaft respectively, and a fan 13 provided adjacent the outer end of the outer labyrinth seal to dissipate the exterior air flowing toward said labyrinth seal, as shown in FIGS. 2 and 3.

Now, the construction of the bearing device according to the invention will be described in detail. In mounting the roller bearing 2 on the rotary shaft 1, the inner race of the roller bearing is fixedly secured to a fixed position of the rotary shaft 1. To this end, bearing holder rings 4 and 5 are fixedly mounted on the rotary shaft 1 on both sides of the inner race. The outer race of the roller bearing 2 is mounted in the end plate 3 and the opposite side surfaces of said roller bearing are covered with the bearing covers 6 and 7 respectively attached to said end plate 3. The portions of the bearing covers 6 and 7 adjacent the rotary shaft 1 are opposed by the bearing holder rings 4 and 5 with slight gaps therebetween respectively, and said slight gaps are made long in length and crooked to increase the flow resistance to the air flowing into said gaps, thus forming labyrinth seals. The bearing holder rings 4, 5 and the bearing covers 6, 7 form lubricant chambers 8 and 9 on both sides of the roller bearing 2 respectively, and grease is filled in said chambers for the lubrication of the roller bearing 2. The outer bearing holder ring 4 has the fan 13 provided thereon. The fan 13 is located adjacent the outer end of the labyrinth seal formed by the bearing holder ring 4 and the bearing cover 6, and so constructed as to expel the dusts and water droplets moving toward the labyrinth and to generate a pressure substantially equal to the negative pressure acting in the outer end of the labyrinth formed by the bearing holder ring 5 and the bearing cover 7, so as to maintain the internal pressure of the bearing device unchanged.

During rotation of the motor having such construction of the bearing device as described above, a negative pressure is developed within the motor (on the right side of the bearing cover 7 as viewed in FIG. 2) and said negative pressure acts at that end of the labyrinth seal facing the interior of the motor. Therefore, the air exterior of the motor (on the left side of the bearing cover 6 as viewed in FIG. 2) tends to be sucked into the interior of the motor through the outer labyrinth seal, the roller bearing and the inner labyrinth seal. However, since the fan 13 is rotating at the outer end of the outer labyrinth seal while generating a pressure corresponding to the negative pressure interior of the motor, the pressures acting at both ends of the labyrinth seal become equal. Thus, no air flows through the bearing device and accordingly no dust intrude into the bearing device. The grease in the lubricant chambers 8 and 9 becomes extremely softened during operation of the motor by the elevating temperature and stirring action of the roller bearing 2. If air flows through the bearing device, the softened grease will flow outwardly of the bearing device along with the air flow. In the bearing device of the invention, however, the grease does not move out of the lubricant chamber as no air flows through the bearing device.

The negative pressure interior of the motor and the pressure generated by the fan 13 are not always equal and occasionally a slight pressure differential appears therebetween, causing air to flow through the bearing device. In practice, however, the air flow thus caused is blocked by the flow resistance provided by the outer and inner labyrinth seals and no air is allowed to flow through the bearing device.

Even when a slight air flow occurs despite the effect of the fan 13 and the flow resistance of the labyrinth seals, the dust and water droplets moving into the outer labyrinth seal will be substantially entirely dissipated by the fan 13 and not be allowed to enter the bearing device, if the peripheral speed of the fan 13 is higher than the velocity of the air flow. It has been confirmed through experiment that the bearing device of the construction described above fully achieves its intended objects when used with electric motors the maximum internal negative pressures of which are up to about $-70$ mmAq.

Figure 4:
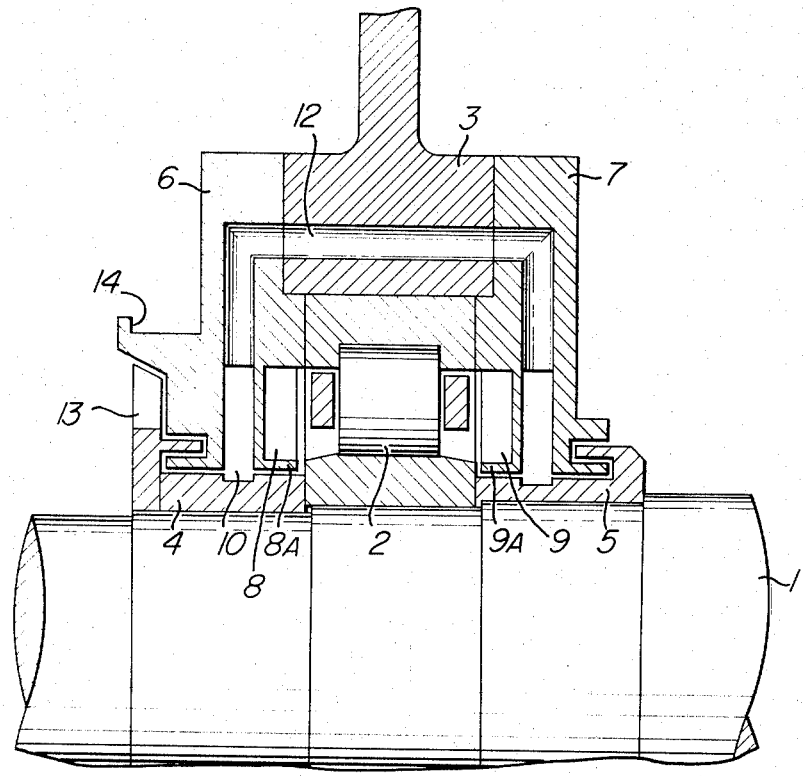
FIG. 4 is a vertical sectional view showing the upper half portion of another embodiment of the bearing device according to the invention.

In the event when the internal and external pressures of the motor are not equal to each other and a slight air flow occurs through the bearing device, it may be possible for the grease flow out of the bearing device along with the air flow. However, the outward leakage of the grease can be completely eliminated by employing another embodiment of the bearing device of this invention shown in FIG. 4. The bearing device shown in FIG. 4 is adapted for use with electric motors in which a particularly large negative pressure, e.g., a negative pressure of as large as $-250$ mmAq develops. The construction of this bearing device will be described hereunder with reference to FIG. 4. This embodiment is essentially the same as the preceding embodiment shown in FIGS. 2 and 3, with respect to the relative position of the rotary shaft 1, the roller bearing 2, the end plate 3, the bearing holder rings 4 and 5, the bearing covers 6 and 7, the lubricant chambers 8 and 9, the fan 13 and the labyrinth seals. However, the lubricant chambers 8 and 9 have peripheral walls 8A and 9A extending parallel to the holder rings 4 and 5 with a slight gap therebetween respectively, with the inner edges thereof located adjacent the inner race of the roller bearing 2. Further, annular air chambers 10 and 11 are formed in the bearing covers 6 and 7 to surround the holder rings 4 and 5 in parallel relation to the lubricant chambers 8 and 9, respectively. These annular air chambers 10 and 11 are communicated with each other by a channel 12 extending through the bearing cover 6, the end plate 3 and the bearing cover 7.

Such being the construction, the occurrence of a substantial pressure differential between the negative pressure developing within the motor (on the right side of the bearing cover 7 as viewed in FIG. 4) and the exterior pressure of the motor (on the left side of the bearing cover 6 as viewed in FIG. 4) can be prevented to some extent by the effect of the fan 13. The pressure differential can also be reduced by the labyrinth seals formed on both sides of the bearing device. However, the pressure differential reducing effects of the fan 13 and the labyrinth seals are subjected to a limitation and the air exterior of the motor is sucked into the bearing device through the outer labyrinth seal under the influence of the negative pressure within the motor. In this embodiment of the bearing device, the air sucked through the outer labyrinth seal, which otherwise would flow into the roller bearing 2 beyond the lubricant chamber 8, flows into the air chamber 10 communicating with the inner end of the outer labyrinth seal and thence into the other air chamber 11 through the channel 12 which is small in flow resistance. The air entering the air chamber 11 is sucked into the motor through the inner labyrinth seal and discharged from the motor to the outside together with the cooling air.

As described, the air flowing into the bearing device by virtue of a certain amount of pressure differential which cannot be eliminated even by the effects of the fan 13 and the labyrinth seal is led to pass around the roller bearing 2 by the air chamber 10, the channel 12 and the air chamber 11, and not admitted into the roller bearing. Therefore, no air flows through the roller bearing 2 which is larger in flow resistance than the channel 12 and hence no dust nor water droplets are allowed to intrude into the bearing chamber 2. Consequently, the deterioration of the grease, embracing the roller bearing 2, by contact with air and the outward leakage of the same from the bearing device can be prevented.

It may be considered that the formation of the channel 12 and the air chambers 10 and 11 around the roller bearing 2 makes it unnecessary to provide the fan 13. However, should the fan 13 be not provided, the water droplets and dust exterior of the motor would have more chance of intrusion into the air chamber 10 and the channel 12, and finally the channel 12 would be clogged with the dust which accumulate more and more as the flow resistance of the channel 12 increases. Upon occurrence of such condition, a pressure differential acts on both sides of the roller bearing 2 or more specifically, at the outer ends of the slight gaps between the peripheral walls 8A, 9A of the lubricant chambers 8, 9 and the bearing holder rings 4, 5 with the result that the waterdrops and dust intrude into the roller bearing 2 and the grease leaks out of the bearing device. The fan 13 is necessary for this reason. Namely, if the peripheral speed of the fan 13 is higher than the velocity of the waterdrops and dust being sucked into the air chamber 10 through the outer labyrinth seal, it will be possible to dissipate the water drops and dust by the fan 13 before they are admitted into the labyrinth seal and thereby the intrusion of the water drops and dust into the air chamber 10 and the channel 12 can be prevented. The intrusion of the water droplets and dust can be substantially restricted, even if the peripheral speed of the fan 13 cannot be increased to a sufficiently high level.

As a matter of course, the electric motors for vehicles are used under severe weather conditions. Therefore, it is conceivable that, in heavy rain or snow, water flows along the surface of the bearing cover 6 and intrudes into the slight gap between said bearing cover and the bearing holder ring 4. In practice, however, the water is substantially entirely dissipated by the fan 13 and not allowed to penetrate into the roller bearing, but there still is the possibility of the water intruding into the labyrinth seal. Therefore, in the embodiment shown in FIG. 4 a water receiving trough 14 is formed on the bearing cover 6, surrounding the outer periphery of the fan 13. Thus, the rain water flowing along the surface of the bearing cover 6 is received by the water receiving trough 14 to be led to the other portion of said cover and the intrusion of a large amount of water directly into the fan 13 can be prevented.

Although the bearing device of the present invention has been described as applied to a vehicle motor, it should be understood that it is applicable not only to the vehicle motors but also to the other types of electric motors or rotary machines.

Further, although the present invention has been described with regard to a roller bearing, it should be understood that it is applicable not only to the roller bearing but also to a ball bearing.

As described herein, according to the present invention a dust seal having a fan effect is provided adjacent the outer end of the slight gap formed between the outer bearing cover, which covers the outer surface of the bearing, and a rotary body, e.g., a rotary shaft, or a ring member. Therefore, it is possible to substantially equalize the pressure acting on both sides of the bearing device and hence the intrusion of dust or water droplets into the bearing device, otherwise occurring by virtue of the pressure differential between both sides of the bearing device, can be prevented. Furthermore, according to the invention the inner ends of the slight gaps, formed between the inner and outer bearing covers and the rotary body respectively, are communicated with each other by a channel formed around the bearing. Therefore, no air is allowed to flow through the bearing even when a pressure differential occurs between both sides of the bearing device. Still further, since a water receiving trough is provided surrounding the outer periphery of the dust seal, the intrusion of water into the bearing device can be prevented even when bearing device is used in the heavy rain.

In summary, it is possible according to the invention to prevent air from passing through the bearing, and accordingly to prevent dust and water droplets from intruding into the bearing device and to prevent the lubricant from leaking outwardly of the bearing. Therefore, the present invention is of great practical advantage in that the lubricant within the bearing can be protected against deterioration, the maintenance and inspection works of the bearing can be substantially simplified and the reliability of the bearing device can be markedly enhanced.

We claim:

1. A bearing device for rotary machines comprising a rotary shaft extending outwardly through a wall of a rotary machine, bearing means mounted in said wall and supporting said rotary shaft at a portion penetrating through said wall, and bearing covers covering an inner and an outer side of said bearing means with each cover having a peripheral portion located close to said rotary shaft, and a dust seal including a fan means provided exteriorly adjacent to the outer end of a slight gap formed between an outer one of said bearing covers with respect to the rotary machine and said rotary shaft.

2. A bearing device for rotary machines, according to claim 1, wherein inner ends of the slight gaps formed between said bearing covers and said rotary shaft respectively communicate with each other by a channel extending around said bearing means.

3. A bearing device for rotary machines, according to claim 1, wherein an outer periphery of said dust seal includes a water receiving trough.

4. A bearing device for rotary machines, according to claim 2, wherein an outer periphery of said dust seal includes a water receiving trough.

5. A bearing device for rotary machines comprising a rotary shaft extending outwardly through a wall of a rotary machine, bearing means mounted in said wall supporting said rotary shaft at a portion penetrating through said wall, ring members fixedly mounted on said rotary shaft for securely holding an inner race of said bearing means in a fixed position on said rotary shaft, and bearing covers covering an inner and an outer side of said bearing means with each cover having a peripheral portion located close to said rotary shaft, and a dust seal including fan means provided exteriorly adjacent the outer end of a slight gap formed between an outer one of said bearing covers and an outer one of said ring members with respect to the rotary machine.

6. A bearing device for rotary machines, according to claim 5, wherein inner ends of the slight gaps formed between said bearing covers and said ring members, respectively, communicate with each other by a channel extending around said bearing means.

7. A bearing device for rotary machines, according to claim 5, wherein an outer periphery of said dust seal includes a water receiving trough.

8. A bearing device for rotary machines, according to claim 5, wherein slight gaps formed between said bearing covers and said ring members respectively are crooked to form labyrinth seals.

9. A bearing device for rotary machine, according to claim 6, wherein slight gaps formed between said bearing covers and said ring members respectively are crooked to form labyrinth seals.

10. A bearing device for rotary machines, according to claim 6, wherein an outer periphery of said dust seal includes a water receiving trough.

11. A bearing device for rotary machines, according to claim 7, wherein slight gaps formed between said bearing covers and said ring members respectively are crooked to form labyrinth seals.

12. A bearing device for rotary machines, according to claim 8, wherein an outer periphery of said dust seal includes a water receiving trough.

13. A bearing device for rotary machines, according to claim 1, wherein said bearing means includes a roller bearing.

14. A bearing device for rotary machines, according to claim 1, wherein said bearing means includes a ball bearing.

15. A bearing device for rotary machines, according to claim 1, wherein gaps formed between said peripheral portion of said bearing cover and said rotary shaft are crooked in order to form labyrinth seals.

16. A bearing device for rotary machines, according to claim 5, wherein said bearing means includes a roller bearing.

17. A bearing device for rotary machines, according to claim 5, wherein said bearing means includes a ball bearing.

* * * * *